Aug. 23, 1938.  L. M. BROWDER  2,127,764
SAFETY SWITCH
Filed Feb. 26, 1936  2 Sheets-Sheet 1
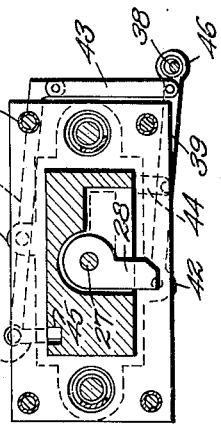
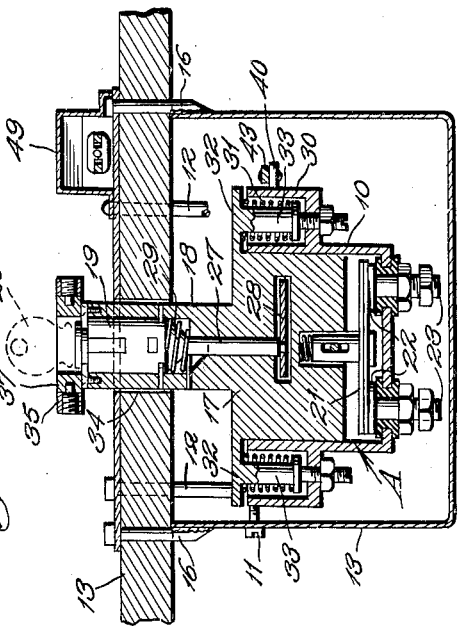
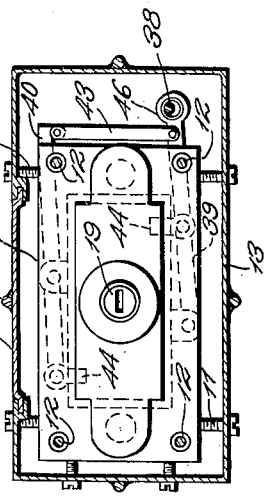
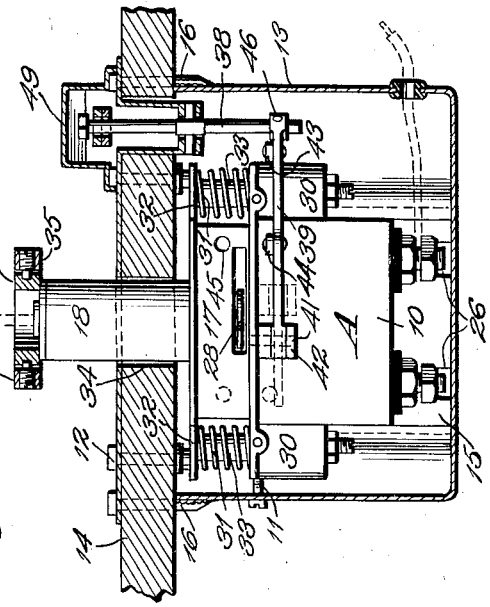
Lewis M. Browder
INVENTOR
BY Victor J. Evans & Co.
ATTORNEY Aug. 23, 1938.  L. M. BROWDER  2,127,764
SAFETY SWITCH
Filed Feb. 26, 1936   2 Sheets-Sheet 2
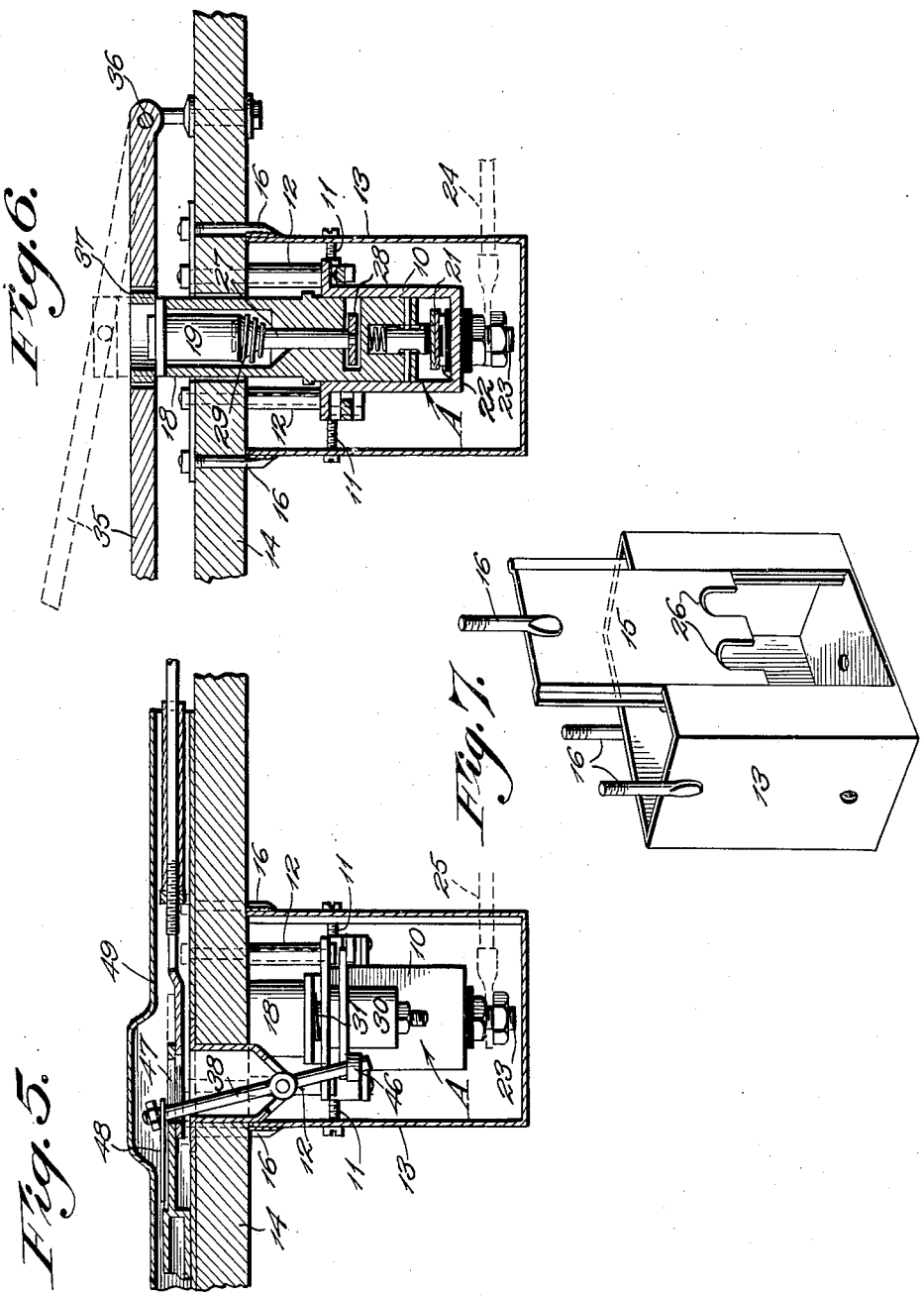
Lewis M. Browder
INVENTOR
BY Victor J. Evans & Co.
ATTORNEY
R. E. Wise.
WITNESS Patented Aug. 23, 1938

2,127,764

UNITED STATES PATENT OFFICE 2,127,764

SAFETY SWITCH

Lewis M. Browder, East Columbus, Ohio

Application February 26, 1936, Serial No. 65,911

2 Claims. (Cl. 200—44)

The invention relates to a safety switch for use in an electric system of an automobile and is a continuation in part of the subject matter of an application for United States Letters Patent, filed on or about the eleventh day of March, 1935, Serial No. 10,571 which matured into Patent No. 2,043,880 issued June 9, 1936.

The primary object of the invention is the provision of a switch of this character, wherein a battery can be cut off from the electric ignition system as installed within an automobile so as to eliminate theft of the same or conflagration as often occurs, the switch in its construction being adaptable for association of the doors of the body of the automobile so that should a person controlling the operation of the vehicle neglect to shut off ignition and leave the vehicle on the opening of either door for an exit the ignition system will be open and the battery cut off from such circuit.

Another object of the invention is the provision of a switch of this character, wherein the ignition circuit may be closed through the use of a key operated lock and such circuit automatically opens so that there is no liability of the ignition circuit including the starter circuit remaining closed when an operator of the vehicle has left the same and also eliminates the possibility of the running of the motor when the vehicle is vacated by the operator.

A further object of the invention is the provision of a switch of this character, wherein the same is applicable to different types of motor vehicles and also is susceptible of use in other places and avoids the necessity of any material change in the circuit arrangement of the electric system for such vehicle and affords a safety device against fire and theft, the ignition circuit being susceptible of closing through the use as is conventional of a key actuated lock and the said circuit being automatically opened for safety purposes.

A still further object of the invention is the provision of a switch of this character, which is comparatively simple in its construction, thoroughly reliable and efficient in its operation, compact, readily and easily mounted in a motor vehicle, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a fragmentary sectional view through a switch constructed in accordance with the invention and in normal open position.

Figure 2 is a view similar to Figure 1 excepting that the switch is shown in section and in closed position.

Figure 3 is a top plan view.

Figure 4 is a fragmentary horizontal sectional view showing the switch in open position and locked in that position.

Figure 5 is a fragmentary vertical sectional view showing the switch closed and the relative position of adjuncts.

Figure 6 is a vertical transverse sectional view through the parts shown in Figure 5 and showing by full lines the switch closed and the actuating lever in lowered position while by dotted lines is shown the position of the lever when the switch is opened.

Figure 7 is a perspective view of the housing for the switch and a slide section thereof partly opened.

Similar reference characters indicate corresponding parts throughout the several views in the drawings.

Referring to the drawings in detail, A designates generally the safety switch constituting the present invention which is adapted to be arranged in an electric wiring system installed within an automobile including the ignition and starter circuits for shutting off a battery (not shown) or opening such circuit and this switch comprises a box 10 made from sheet metal and having a suitably insulated bottom. The box 10 is fixedly held by fasteners 11 and 12, respectively, within a housing 13 and spaced below the floor 14 the required distance, the housing 13 being provided with a door section 15 slidably fitted therewith. The housing 13 and the door section carry hanger bolts 16, these being anchored in the floor 14, the sliding door section 15 fitted with the housing being for convenience in the assembling of the switch parts within said housing and the placement thereof beneath the floor 14. The fasteners 11 are engaged with the housing 13 including its section 15 while the fasteners 12 are engaged with the floor 14. Slidably fitted in the boxing 10 is a movable switch block 17 made from insulating material and formed with a vertical tubular column forming a depressible stem 18 providing a casing for a locking cylinder 19 of the key actuated tumbler type, the cylinder 19 being turned when the key 20 therefor is inserted therein as the tumblers within the cylinder 19 will be moved to release position on the insertion of said key. The block yieldably supports a switch blade 21 for engaging terminal contacts 22 of binder posts 23 for circuit wires 24 and 25, respectively, of the electric system installation within a motor vehicle to close the circuit for ignition purposes. The box of the switch 21 is preferably made from sheet metal having a suitably insulated base. When the switch 21 engages the contacts 22 it is in circuit closing position and when said switch 21 is disengaged from the contacts 22 the same is in circuit opening position and the battery (not shown) cut off.

The door section 15 of the housing 13 is provided with the openings 26 for the wires 24 and 25 so that the same may lead into the housing and be engaged on the posts 23.

The cylinder 19 is formed with a shaft 27 preferably fitting in the block 17 and has therein a swinging latch 28, the latter being adapted to engage with the top of the box 10 to hold the switch 21 out of engagement with the contacts 22 or in open position when the block is elevated. The cylinder 19 is turned clockwise by the action of a coiled spring 29 about the shaft 27 to bring the latch 28 within locking position at the top of the box 10 with the switch 21 open and such cylinder 19 is turned counter-clockwise by the key 20 for the unlocking of the latch 28 to permit the switch 21 to be moved to circuit closing position.

Formed on the box 10 are spring barrels 30, these being located beyond opposite ends of said housing and having adjustably arranged therein coiled tensioning springs 31 working against extensions 32 of the block 17 and about centering lugs 33 of said extensions, the purpose of the springs 31 being to raise the block 17 for the opening of the switch 21 and the locking or unlatching of said block by the latch 28 in its raised position within the box 10. In this raised position of the block 17 the stem 18 constituting the shell or casing for the cylinder 19 is protruded through a clearance 34 in the floor 14 slightly above the same and overhanging this stem is a foot pedal 35 pivoted for vertical swinging movement in a bearing 36 fixed in the floor, the said foot pedal 35 being fitted with a self-adjusting pivotal striker 37 for the stem 18. It will be seen that by pressing the foot pedal 35 which has its striker 37 playing directly on the stem 18 of the block 17 the latter will be lowered in the box 10 to bring the switch 21 into closing position and in engagement with the contacts 22 thus closing the electrical system including the ignition and starter circuits. It is, of course, understood that before the block 17 may be lowered it is necessary that the cylinder 19 of the lock be turned to release the said block 17 by disengaging the latch 28 from the top of the box 10.

The latching means for the switch as operated by the arm 38 comprises a pair of levers 39 and 40, respectively, these being arranged at opposite sides of the box 10 and are pivoted at 41 in bearings 42 provided on said box, they being pivotally joined by a link connection 43 and carrying locking bolts 44 engageable in keeper notches 45 provided in the block 17 to hold the latter lowered within the box 10 and the switch 21 closed and engaging the contacts 22. The lever 39 carries an eye 46 engaged by the arm 38 so that this arm when pushed by operating members 47 or pulled by the member 48 will release the bolts 44 from the block and the switch will move to open position. The arm 38 is tensioned through a connection attached to a conduit 49 and functions to urge the bolts 44 in latching direction for the automatic engagement with the keeper sockets 45 in the block 17 when the same is lowered in the box 10 and thus lock the switch 21 in closing position until the block 17 is automatically released, as for example, by the opening of doors (not shown) of a motor vehicle.

In the operation of the device, normally the switch 21 is open or in circuit open position and the block 17 raised in the box 10 with the latch 28 engaging the top of said box to hold the block raised or the switch open, it being also understood that the doors of the automobile are closed and latched. To close the switch 21 the operator within the automobile engages the key 20 in the cylinder 19 and by turning the cylinder releases the latch 28 whereupon by depressing the foot pedal 35 the block 17 is lowered in the box 10 to bring the switch 21 to a closing position by engaging the contacts 22. Under the action of the tension upon the push and pull members the locking bolts will engage sockets 45 in the block locking the latter in the lowered position in the box 10 to hold the switch closed. Now should the operator fail to effect the opening of the switch 21 on the exit of the operator from the vehicle by opening either of its doors the swinging thereof to open position will cause the arm 38 to be operated and thus the bolts 44 will be thrown to releasing position or disengage from the keeper notches whereupon the block 17 under the action of the springs 31 will elevate for the opening of the switch 21 disengaging it from the contacts 22 and thus cutting off the battery or opening the electric system and said block 17 in this elevated or raised position will become latched under the action of the springs 29 turning the cylinder 19 of the lock bringing the latch 28 into latching position with the top of the box 10 and thereby opening the electrical system so that the motor of the vehicle can not operate and in this fashion serving as safety against fire or theft. It is impossible to close the switch 21 until the latch 28 has been released by the use of the key 20 in the lock cylinder 19. Now it should be seen from the foregoing that should an operator fail to turn off the ignition circuit of the system installed within a vehicle and on vacating the latter by opening either door thereof the ignition circuit will be opened automatically as the switch 21 will be moved to opened position and cutting off the battery from the electric system.

What is claimed is:

1. The combination of a switch, means for moving the switch to position for closing an electric circuit, key operated means for locking the switch open, a carrier block for the switch and including a fitting for the second-named means, means for locking the switch closed and including a socket in the carrier block and a pivoted lever having a bolt adapted to engage the socket, means for moving the bolt from the socket and including an arm, and means for automatically moving the switch to open position.

2. The combination of a switch, means for moving the switch to position for closing an electric circuit, key operated means for locking the switch open, means for locking the switch closed, means engageable with the last-named means for the release thereof, a foot pedal included in the first-named means, a carrier block for the switch and including a fitting for the second-named means, spring means for moving the switch to open position, spring means for the second-named means for bringing the same to locking position, and a self-adjusting striker carried by the pedal and engageable with the fitting of the carrier for the switch.

LEWIS M. BROWDER.